(12) United States Patent
Ahern et al.

(10) Patent No.: US 6,487,994 B2
(45) Date of Patent: *Dec. 3, 2002

(54) SUB-CRITICAL WATER-FUEL COMPOSITION AND COMBUSTION SYSTEM

(75) Inventors: Brian S. Ahern, Boxboro, MA (US); Charles W. Haldeman, Concord, MA (US); John T. Preston, Hingham, MA (US)

(73) Assignee: Supercritical Combustion Corporation, Woburn, MA (US)

( * ) Notice: Subject to any disclaimer, the term of this patent is extended or adjusted under 35 U.S.C. 154(b) by 1 day.

This patent is subject to a terminal disclaimer.

(21) Appl. No.: 09/769,049

(22) Filed: Jan. 24, 2001

(65) Prior Publication Data

US 2001/0029701 A1 Oct. 18, 2001

Related U.S. Application Data

(63) Continuation-in-part of application No. 09/359,509, filed on Jul. 23, 1999, now Pat. No. 6,240,883.

(51) Int. Cl.$^7$ ............................................... F02B 47/04
(52) U.S. Cl. .................................... 123/25 R; 123/25 E
(58) Field of Search ............................ 123/25 R, 25 E, 123/25 F, 25 K, 25 P, 525

(56) References Cited

U.S. PATENT DOCUMENTS

| 2,152,196 A | | 3/1939 | Kokatnur ........................ 44/9 |
|---|---|---|---|
| 3,717,129 A | * | 2/1973 | Fox .............................. 123/1 A |
| 3,918,412 A | * | 11/1975 | Lindstrom .................. 123/25 A |
| 3,968,775 A | | 7/1976 | Harpman ....................... 123/25 |
| 4,048,963 A | | 9/1977 | Cottell ........................... 123/25 |
| 4,259,021 A | | 3/1981 | Goudy, Jr. .................... 366/118 |
| 4,410,334 A | * | 10/1983 | Parkinson ...................... 44/451 |
| 4,430,251 A | | 2/1984 | Patterson et al. ........ 252/359 R |
| 4,884,533 A | | 12/1989 | Risitano et al. ................ 123/25 |
| 4,907,368 A | | 3/1990 | Mullay et al. .................. 44/51 |
| 5,154,142 A | | 10/1992 | Kamo ............................ 123/25 |
| 5,503,772 A | | 4/1996 | Rivas et al. .................. 252/314 |
| RE35,237 E | * | 5/1996 | Gunnerman ................. 123/1 A |
| 5,582,139 A | * | 12/1996 | Feuerman .................... 123/25 B |
| 5,725,609 A | * | 3/1998 | Rivas et al. ............... 123/25 A |
| 6,010,544 A | * | 1/2000 | Haldeman et al. ............. 44/301 |
| 6,170,441 B1 | * | 1/2001 | Haldeman et al. ......... 123/25 D |
| 6,240,883 B1 | * | 6/2001 | Ahern et al. ............... 123/25 E |

FOREIGN PATENT DOCUMENTS

| WO | 9931204 | 6/1999 | ............. C10L/1/32 |
|---|---|---|---|
| WO | 0107542 | 2/2001 | ............. C10L/1/32 |

* cited by examiner

Primary Examiner—Tony M. Argenbright
Assistant Examiner—Hai Huynh
(74) Attorney, Agent, or Firm—Theresa A. Lober (57) ABSTRACT

There is provided a water-hydrocarbon mixture. In one example, the mixture includes low-molecular weight hydrocarbon and between about 5% and about 70% water. The mixture is in the gaseous state, and is at a pressure that is below the critical pressure of the mixture. The mixture temperature is above about 28° C. less than the boiling point temperature of water at the mixture pressure and is below about 450° C. The mixture provides a local environment of water molecules, tending to limit hydrocarbon polymerization and other undesirable side reactions and keeping the hydrocarbon from precipitating from the mixture, for a faster, more complete combustion cycle characterized by lower emissions of carbon monoxide, unburned hydrocarbons, and volatile organic and polyaromatic hydrocarbons. The hydrocarbon preferably includes hydrocarbon micro-droplets of a diameter of no more than about 1 μm.

21 Claims, 4 Drawing Sheets

SUB-CRITICAL WATER-FUEL COMPOSITION AND COMBUSTION SYSTEM

This Application is a continuation-in-part of application Ser. No. 09/359,509, filed Jul. 23, 1999, now issued as U.S. Pat. No. 6,240,883.

BACKGROUND OF THE INVENTION

This invention relates to hydrocarbon fuel compositions, and more particularly relates to water-hydrocarbon fuel mixtures and systems for combusting such mixtures, including mixtures containing low-molecular weight hydrocarbons.

Federal clean air legislation has targeted fossil fuel emissions. This legislation has prompted engine manufacturers and fuel providers to look for solutions to be able to continue selling their products. Refiners must look at alternative formulations and/or blends to reduce emissions. Engine designers, on the other hand, must rethink the entire combustion process and how it is conducted from beginning to end.

Combustion engine manufacturers are increasingly employing the use of tighter tolerances on piston-wall machining to reduce engine oil burning. Additionally, combustion engine manufacturers are employing higher and higher combustion zone fuel injection pressures. Such higher pressures result in better spray penetration of fuel into the combustion zone as well as finer fuel droplet sizes, and the higher pressures permit smaller orifices at the injector tips while maintaining the same mass flow rate.

With newly developed fuel injectors operating at up to 30,000 psi, the fuel droplet size is reduced but the droplet dimensions are still in the 60 $\mu$m–100 $\mu$m range. A fuel droplet size reduction by a factor of two would necessarily be accompanied by an increase in droplet number by a factor of eight from a mass balance perspective. This is important because many small droplets improve the microscopic homogeneity and reduce particulate matter production. However, a reduction to 60 $\mu$m–100 $\mu$m droplet size at these extreme pressures achieves only about a factor of two in particle size reduction over the standard 3800 psi systems.

In general, droplet size of a fluid is primarily related to the viscosity or surface tension of the fluid. Therefore, any process that reduces these properties can potentially reduce the droplet size. A chemical approach to droplet size reduction has been proposed using surfactant technology. Viscosity-reducing or surface tension-reducing additives have been proposed, but high cost and other limitations have limited their efficacy.

The addition of heat to a hydrocarbon fuel reduces surface tension of the fuel. Thus, preheating of a fuel has some appeal from both an emissions and fuel economy perspective. However, when a fuel alone, without other components, is heated to temperatures above the critical temperature of the components of the fuel, e.g., about 250° C., unwanted chemical reactions such as polymerization, oxidation, rapid decomposition, and other such reactions can occur, resulting in undesirable reformulation of the fuel into higher as well as lower molecular weight compounds. The fuel's viscosity generally increases, due to these chemical reactions, at a rate that outpaces the drop in surface tension. As a result, a sticky, tarry residue can be produced. It has generally been found, therefore, that simple preheating of hydrocarbon fuels per se has limited use.

The addition of water to a heated fuel offers benefits, but water and hydrocarbons do not mix readily. The polar nature of water and the non-polar character of fuels favor phase separation into two unmixed pure liquids. Water does not exhibit an antibonding interaction with fuels. It simply has an overwhelmingly strong attraction for other water molecules that precludes bonding with hydrocarbon units. This phase separation property can be ameliorated by the addition of surfactants and cosurfactants, but such are generally expensive and can pose materials compatibility issues in use, among other issues.

SUMMARY OF THE INVENTION

The invention provides a low-molecular weight hydrocarbon and water mixture that overcomes the limitations of prior fuel compositions. In one embodiment of the invention, this mixture includes low-molecular weight hydrocarbon and between about 5% and about 70% water. The mixture is at a pressure that is below the critical pressure of the mixture. The mixture is all in the gaseous state and is at a temperature that is between about 28° C. (50° F.) below the boiling point temperature of water at the mixture pressure and about 450° C. (842° F.). The term "low-molecular weight hydrocarbon" as used herein includes methane, ethane, propane and other hydrocarbons which have a molecular weight below 60. Such hydrocarbons may be present as essentially pure compounds or as mixtures comprising two or more low-molecular weight hydrocarbon compounds. For example, pipeline natural gas is particularly useful herein and typically comprises more than about 90% methane, with the remainder typically being mainly ethane and propane.

This mixture provides a local environment of water molecules that tend to limit hydrocarbon polymerization and other undesirable side reactions and keep the hydrocarbon from precipitating from the mixture. This results in "cleaner" combustion of the mixture with reduced particulate matter and nitrous oxide emissions, compared with that which results from the combustion of otherwise comparable water-hydrocarbon mixtures at temperatures below about 28° C. (50° F.) less than the boiling point of water at the sub critical pressure employed. The present invention thereby provides for a faster, more complete combustion cycle that is characterized by lower emissions of carbon monoxide, unburned hydrocarbons, and volatile organic and polyaromatic hydrocarbons.

In embodiments provided by the invention, the water in the mixture is in a gaseous state, and low-molecular weight hydrocarbon constituents in the mixture are also preferably in a gaseous state. Expansion of such a mixture into the heated air of a cylinder of a combustion engine provides better mixing and combustion at a molecular level than conventional fuels and eliminates the time required for droplet evaporation.

In embodiments provided by the invention, the mixture preferably includes between about 5% and about 70% water with the remainder consisting essentially of low-molecular weight hydrocarbon, and more preferably between about 25% and about 60% water. The low-molecular weight hydrocarbon is preferably a hydrocarbon fuel, and can preferably be provided as, e.g., methane, ethane, or natural gas. The mixture can consist essentially of hydrocarbon fuel and water.

In further embodiments, the temperature of the mixture is maintained above about 14° C. (25° F.) less than the boiling point temperature of water at the mixture pressure. Where the hydrocarbon fuel is provided as methane, it can be preferable to maintain the mixture at a temperature below about 363° C.

In a further aspect of the invention, there is provided a fuel system. The system includes a source of water and a source of low-molecular weight hydrocarbon fuel. At least one pump is provided, having an inlet connected to receive at least one of the water and the hydrocarbon fuel from the source of water and source of hydrocarbon fuel. The pump has at least one outlet for delivering at least one of a water stream and a hydrocarbon fuel stream to a volume to pressurize and transport the water and hydrocarbon fuel. As used herein, the term "pump" is defined as a device which by mechanical action, increases the pressure of a flowing fluid, such as a liquid or a gas. Such devices for liquids include centrifugal pumps, gear pumps, reciprocating pumps, etc. Such devices for gases include centrifugal compressors (axial or radial), reciprocating compressors, lobed (Rootes) blowers, etc. At least one heater is provided in a connection to heat the water and hydrocarbon fuel. A mixer is connected to receive the water and hydrocarbon fuel to mix together the water and hydrocarbon fuel.

A water-hydrocarbon fuel mixture is provided in the volume. The mixture includes hydrocarbon fuel and between about 5% and about 70% water. The mixture is at a pressure that is below the critical pressure of the mixture and is at a temperature that is above about 28° C. less than the boiling point temperature of water at the mixture pressure, and below about 450° C. (842° F.).

Preferably the volume is of sufficient structural integrity to contain a gaseous composition at a pressure above about 150 psi. Further, the pump is preferably of sufficient structural integrity to deliver at least one of a water stream and a hydrocarbon fuel stream at a pressure above about 2,000 psi. In embodiments of the invention, the fuel system includes an injector connected to an outlet of the volume and a combustion chamber for delivery of the water-hydrocarbon fuel mixture from the volume to the combustion chamber. The injector is preferably of sufficient structural integrity for delivery of the mixture to the combustion chamber under turbulent flow conditions.

In embodiments of the invention, the combustion chamber is a component of, e.g., a diesel engine, a spark ignition engine, a gas turbine engine, or a steam boiler.

In a further aspect of the invention, there is provided a method for forming and combusting a hydrocarbon-based fuel. In the method, a mixture is formed including a low-molecular weight hydrocarbon fuel and between about 5% and about 70% water. The mixture is pressurized to a pressure that is below the critical pressure of the mixture. The hydrocarbon fuel and the water of the mixture are heated to a temperature that is between about 28° C. (50° F.) less than the boiling point temperature of water at the mixture pressure and about 450° C. (842° F.). The mixture is then delivered to a combustion chamber and combusted.

In embodiments of the invention, the step of forming the mixture is carried out before the step of heating the mixture, and the step of heating the mixture is carried out by heating the mixture to a temperature above about 125° C. (257° F.). In other embodiments, the step of heating the hydrocarbon fuel and the water of the mixture is carried out before the step of forming the mixture, and is carried out by heating the water and hydrocarbon fuel separately. The method can be carried out employing, e.g., methane fuel, in which case the step of heating the mixture is preferably carried out by heating the mixture to a temperature that is below about 363° C. (685° F.).

The water-hydrocarbon mixture of the invention and the fuel system of the invention have applications for both mobile and fixed applications. For example, the mixture of the invention can be used in the combustor of a gas turbine or jet engine as used in aircraft, marine, automotive or stationary power generation applications.

Other applications, features, and advantages of the invention will be apparent from the following description and associated drawings, and from the claims.

DETAILED DESCRIPTION OF THE INVENTION

Figure 1:
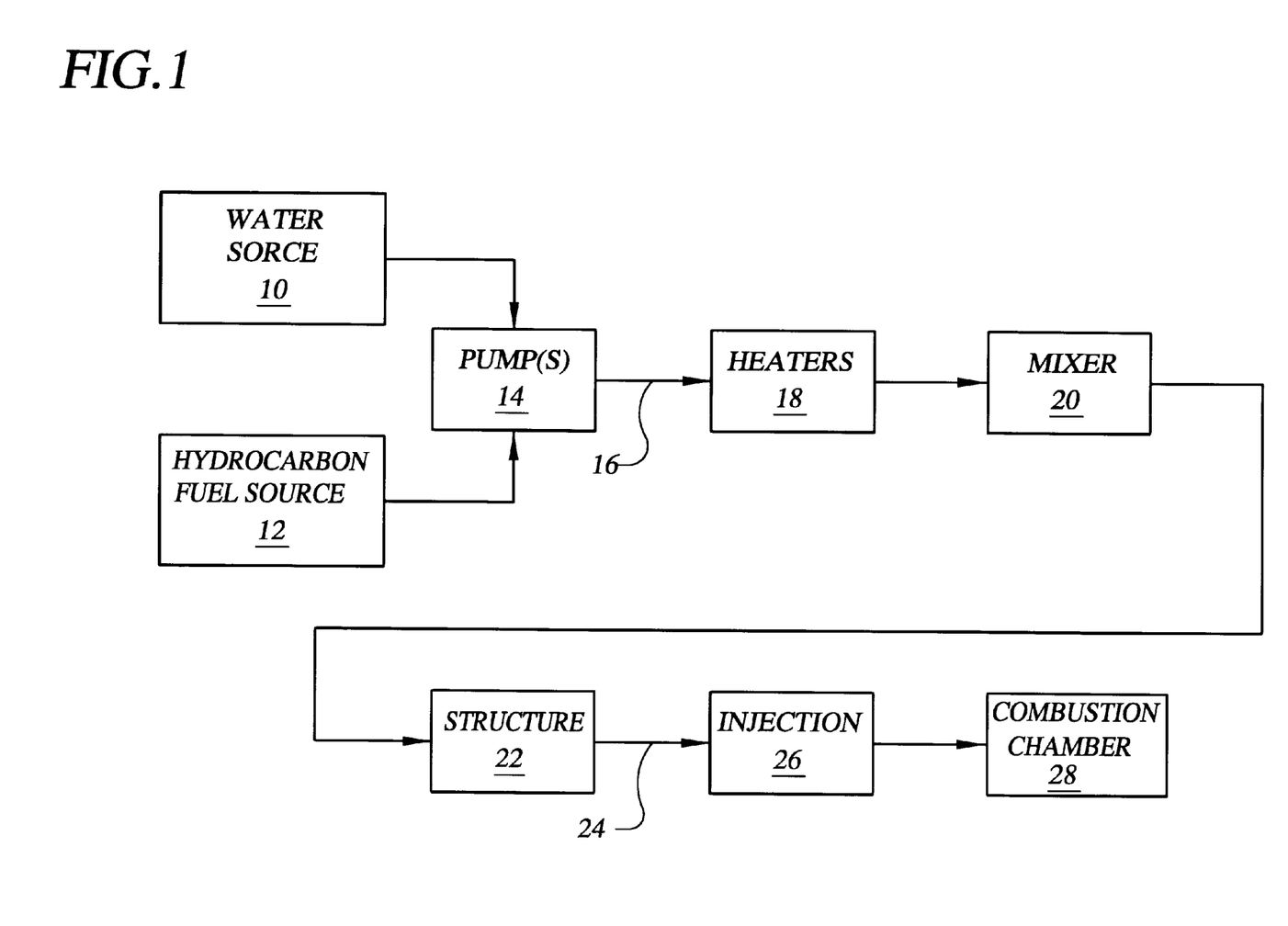
FIG. 1 is a block diagram of a subcritical water-fuel combustion system provided by the invention.

With reference to FIG. 1, there is shown a water source 10 and a hydrocarbon source 12, which can be provided as a source of low-molecular weight hydrocarbon in accordance with the invention. Each source is provided in the form of, e.g., a pipe or other suitable vessel, and each connected to a corresponding individual pump, or alternatively, as shown, to a dual fluid metering pump 14, having one or more outlets 16. Although the both water and hydrocarbon components of mixtures of this invention are each ultimately preferably employed in their gaseous states, these components can be provided initially in either the liquid or gaseous state prior to the formation of the ultimate mixture thereof. For example, water is in the liquid state at ambient temperature and pressure, and water either in the liquid form or gaseous water can be used in preparing mixtures of this invention. Similarly, the hydrocarbon component will typically be in the gaseous state at ambient temperature and pressures, although one could utilize, e.g., liquefied or compressed natural gas if desired. The term gaseous state as applied to the water and/or hydrocarbon herein refers to a state in which the hydrocarbon is not in the liquid phase at ambient temperature and pressure, and includes the vapor state and the fluid state characteristic of a material at or near supercritical conditions.

The pumps function to pressurize and facilitate the transport of the water stream the hydrocarbon stream and/or combined streams thereof, with these components being both or singly in either the liquid or gaseous state as desired and appropriate for a given application; as explained above, the components can be maintained in the liquid state until a final mixture is produced in the manner described below. The pumping of the hydrocarbon and water streams or a combined stream can be carried out by conventional means, such as gear or piston pumps. Preferably, the pump is configured, e.g., by sizing, to produce a desired stream pressure.

One or more heaters 18 are provided to heat the water and hydrocarbon streams, either separately or after a combined stream thereof has been formed. The heating can be carried out by conventional means, employing, e.g., a pipe, tank, or other heating container. The heating source can be, e.g., electrical, process fluid, or other suitable source. For example, double-pipe or shell and tube heat exchangers, electrical resistance coil or bayonet heaters, or other heating source, is suitable.

It is generally preferable to pump a water stream and a hydrocarbon stream in a duel metering scenario like that shown in the figure. If alternatively the streams are separately pumped and heated they are then directed to a mixer 20 downstream of the heater 18. For the duel pump scenario shown in the figure, the mixer 20 can instead be provided upstream of the heater and/or as a chamber of the pump rather than as a separate unit. The mixer can be provided as a simple tee or venturi mixer, or as another suitable mixing mechanism.

The resultant mixture is transported to and contained in the volume of a structure 22 that can be hydraulically connected to the outlet of the pump, and is configured downstream of and/or integral with the heater and/or mixer. For example, the structure 22 alternatively can have the heater and/or mixer contained within it, e.g., as a vessel with a heating coil and agitator provided therein. The structure 22 has one or more outlets 24. Preferably, the volume of the structure is of sufficient structural integrity to contain a gas at relatively high pressures. In accordance with the invention, the mixture when residing in the structure is in the gaseous state.

An injector 26 is connected to the outlet 24 of the structure 22 and is configured for delivery of the water-hydrocarbon mixture to, e.g., a combustion chamber 28, which can be, e.g., a diesel engine, a spark ignition engine, a gas turbine steam boiler, or other combustor. The tip of the injector is disposed to inject the water-hydrocarbon mixture into the combustion chamber 28. The invention contemplates the delivery and combustion of the mixture to and in both stationary and mobile combustion chamber configurations.

The injector can be heated, if desired, by a heating jacket that can be electrically powered or, more preferably, heated by a heat exchanger connected to tap into the heated exhaust the of the combustion chamber. When heat from a combustion exhaust system is used to provide heat for the injector there results a heat regeneration cycle that extracts useful energy from the exhaust system which adds additional enthalpy to the combustion cycle near the peak of the compression cycle. For many applications, it therefore can be preferable to heat the injector.

In accordance with the invention, for applications in which a low-molecular weight hydrocarbon is not employed, the system described above is employed to produce a water-hydrocarbon mixture in which the pressure of the mixture is below the critical pressure of the mixture and the temperature of the mixture is at least the greater of about 250° C. and the boiling point temperature of water at the mixture pressure; that is, the temperature of the mixture is at least above about 250° C., and if the boiling point temperature of water at the mixture pressure is higher than 250° C., then the mixture is held at least at that boiling point temperature. The temperature of the mixture must be at or above the boiling point of water at the pressure employed, in accordance with the invention for applications in which a low-molecular weight hydrocarbon is not employed, to assure that water present in water-hydrocarbon mixture is in the gaseous, i.e., vapor state.

The critical temperature of a substance or mixture of substances is that temperature above which no amount of pressure will cause the fluid to revert to the liquid state. The critical temperature of water alone is about 374° C. (705° F.) at a pressure of about 3250 psi (220 atmospheres). The addition of a liquid hydrocarbon or a mixture of liquid hydrocarbons to water results in an altering of the critical temperature of the water-hydrocarbon mixture. For example, the critical temperature for a 50/50 mixture of No. 2 hydrocarbon fuel and water is about 363° C. The critical temperature of a mixture of fluids in a fuel is approximately equal to the weighted average of the critical temperatures of each of the fluid species and is generally in the range of between about 250° C. and about 600° C., depending upon the molecular composition and percentage of hydrocarbon in the mixture.

The critical pressure of a fluid is that pressure below which a liquid state would continue to exist at a temperature up to but below the critical temperature of the fluid or mixture of fluids. Above the critical temperature, no amount of pressure will induce the liquid state. The invention requires that the water-hydrocarbon mixture produced by the system of FIG. 1 be held at a pressure that is below the critical pressure of the mixture.

A sub-critical water-hydrocarbon mixture in accordance with the invention can be produced in a variety of ways. For example, referring to FIG. 1, a water stream and a fuel stream, each at ambient conditions, can be first mixed together in the mixer 20, with the mixture then subsequently heated and pressurized to the specified temperature and pressure, e.g., a temperature of about 400° C. (752° F.) and a pressure of about 1500 psi. Alternatively, the water steams and fuel streams can be separately heated and pressurized to suitable levels, e.g., a water temperature of about 500° C. (932° F.) and a fuel temperature of about 250° F. (482° C.), that result, after the separate streams are mixed, in a mixture of the specified temperature and pressure. As a further alternative, a combination of these two methods can be employed, with one or both of the two streams being partially heated and/or pressurized prior to being mixed together and thereafter the mixture being further heated and/or pressurized. For example, the water stream can be heated to a temperature of about 300° C.–400° C., the heated water stream mixed with the unheated fuel stream, and then the mixture further heated to a temperature of about 400° C. In any of the above methods in which the hydrocarbon stream is heated prior to the admixture with heated, e.g., >300° C., water, it is preferable to avoid heating the hydrocarbon stream to a temperature at which unwanted chemical reactions such as polymerization, oxidation, rapid decomposition, or other deleterious process could occur.

In accordance with the invention, for applications in which a low-molecular weight hydrocarbon is employed, once the water and hydrocarbon streams are mixed, the mixture temperature is maintained above about 28° C. (50° F.) less than the boiling point of water at the selected mixture pressure and less than about 450° C. (842° F.). The temperature of the mixture is preferably above about 125° C. (257° F.) and, and for some applications, it can be preferred to impose on the mixture a temperature of between about 240° C. and about 360° C.

Water's boiling point at any given pressure can be readily ascertained by reference to numerous published sources, e.g., *Thermodynamic Properties of Steam*, by Joseph H. Keenan and Frederick G. Keyes, published by John Wiley & Sons, Inc., 28$^{th}$ printing, 1955. It has been found that for sub-critical mixtures of water and low-molecular weight hydrocarbons, by maintaining the temperature of the mixture above about 28° C. (50° F.) less than the boiling point of water at the selected mixture pressure, water present in water-hydrocarbon mixture will be in the gaseous state.

The selected pressure of the mixture is in accordance with the invention held below the critical pressure of the mixture, as defined above. Although not necessary or even desirable, e.g., due to cost, for the practice of this invention, a given mixture can be pressurized to a pressure level above its critical pressure during the process of the mixture formation and then reduced to a pressure below the critical pressure of the mixture. This pressure reduction to a sub-critical pressure can be carried out together with any required temperature adjustment to assure that the temperature of the mixture is at or above the boiling point of water if the hydrocarbon employed is not a low-molecular weight hydrocarbon at the pressure employed or at least about 250° C., whichever is greater, prior to its deployment for combustion.

The invention contemplates a wide sub-critical pressure range, below the 3250 psi critical pressure of water, including pressures as low as, e.g., about 150 psi or lower being suitable. As will be apparent to those skilled in the art, the pressure of the water-hydrocarbon mixture is optimally selected based on the intended combustion application. A relatively higher pressure can be desirable and necessary for some combustion applications; e.g., for combustion in a diesel engine, the water-hydrocarbon mixture can be formed at or later pressurized to pressures above about 2500 psi prior to introduction into the combustion chamber.

Based on the pressure and temperature selected for the water-hydrocarbon mixture of the invention, at least the water phase of the mixture, and for some cases, the hydrocarbon portion as well, will be in a gaseous, vapor state. In the practice of this invention, when the fuel is a low-molecular weight hydrocarbon, both the water and fuel components of the ultimate mixture are employed in their gaseous states. In other words, in accordance with the invention, for any selected mixture pressure and temperature, both the water and the low-molecular weight hydrocarbon in the mixture will be in the form of vapor in the ultimate mixture which is formed according to this invention. In other embodiments in which the hydrocarbon is not a low-molecular weight hydrocarbon, the hydrocarbon in the mixture can be in a substantially liquid state, partially liquid and partially vapor, or substantially entirely vapor.

In the practice of this invention, operating below the critical pressure of a water-hydrocarbon mixture can therefore be evidenced by the presence of the physical mixture of water and hydrocarbon substantially entirely in the vapor state, and by the absence of any supercritical fluid or "dense gas" supercritical phase. The mixture is thus below the supercritical conditions, and is termed sub-critical.

The sub-critical mixtures provided by the invention differ from the homogeneous single phase form in which the mixtures would exist if they were above the critical point of the mixtures, i.e., the transition point at which the liquid and gaseous states of the mixture merge into each other become identical and are characterized as a supercritical fluid or "dense gas." The sub-critical mixtures of the invention are either a two-phase mixture or a less dense gas than a supercritical mixture and do not require the conditions and equipment involved in supercritical handling. Because the mixtures of this invention are substantially entirely in the form of gaseous mixtures, the mixtures are suitable for direct injection into a combustion device, optionally with additional pressurization if necessary or appropriate for a given combustion application, e.g. for a diesel application. A gaseous mixture can thus be found for many applications to be optimal.

Where the selected pressure and temperature render a mixture that includes one or more of the hydrocarbon constituents present in the mixture in the liquid state, and where the liquid is present at a level of greater than about 10%, it is preferred that any such liquid be in the form of micro-droplets, defined herein as liquid droplets having a diameter of less than about 1 $\mu$m. In accordance with the invention such micro-droplets can produced during the initial mixture formation between the water and hydrocarbon streams or can be formed just prior to combustion. In either scenario, subjection of the mixture to turbulent flow conditions to produce micro-droplets is preferably carried out to assure adequate mixing of the phases of the mixture.

The mixtures of the present invention may be subjected to turbulent conditions created by conventional means such as interacting fluid jets of the water and hydrocarbon streams, by wall roughening elements in the injector, which induce eddy currents of small size, or by other mechanism. The imposition of these turbulence conditions assures that any aqueous liquid phase material is at a micro-droplet size dimension at the time of use and, as shown hereinafter, results in significant emission reduction benefits.

The hydrocarbon portion of mixtures provided by the invention is preferably a fuel and can be provided as, e.g. gasoline, diesel (No.2), No.6 fuel, bunker C, kerosene, natural gas, methane, ethane, propane, crude oil or other selected fuel. In embodiments of this invention wherein the hydrocarbon is a low-molecular weight hydrocarbon, only natural gas, methane, ethane, propane or other selected fuel which has a molecular weight below 60 is preferably used.

The water-hydrocarbon mixture of the invention does not require the addition of surfactants and/or cosurfactants for the mixture to demonstrate enhanced combustibility. The mixture can therefore consist essentially of water and hydrocarbon fuel. Commonly used fuel additives such as cetane enhancers, like ethyl hexyl nitrate, corrosion inhibitors, such as benzotriazole, antifreeze compounds, such as methanol, ethanol and/or ethylene glycol, and polymerization inhibitors, e.g., tert butyl catachol, can also be included in the mixture. Such are not understood to interfere with or contribute to the enhanced combustibility of the water-hydrocarbon mixture in the practice of the invention. These additives can be included at the fluid pumps of the system of FIG. 1, or at a suitable point along the stream prior to the delivery to the combustion chamber.

For applications in which a low-molecular weight hydrocarbon is employed, methane can be preferred in the practice of this invention because of methane's unique chemical-bonding properties with water. In particular, it is found that water-methane clathrate clusters preferably form when the water molecules bond with the methane molecules, lowering the energy of the water-clathate clusters with respect to the separate water and methane phases. The practical consequence of this condition is that the presence of methane stabilizes the cluster and makes it the prevalent species under conditions where it otherwise would not be prevalent.

Both water and methane contain hydrogen. One methane molecule contains one carbon atom and four hydrogen atoms ($CH_4$); one water molecule contains one oxygen atom and two hydrogen atoms ($H_2O$). In its simplest form, a water-methane clathrate cluster consists of a methane molecule surrounded ("clathrated") by a pentagonal dodecahedral cage of water molecules as shown in FIG. 2.

Figure 2:
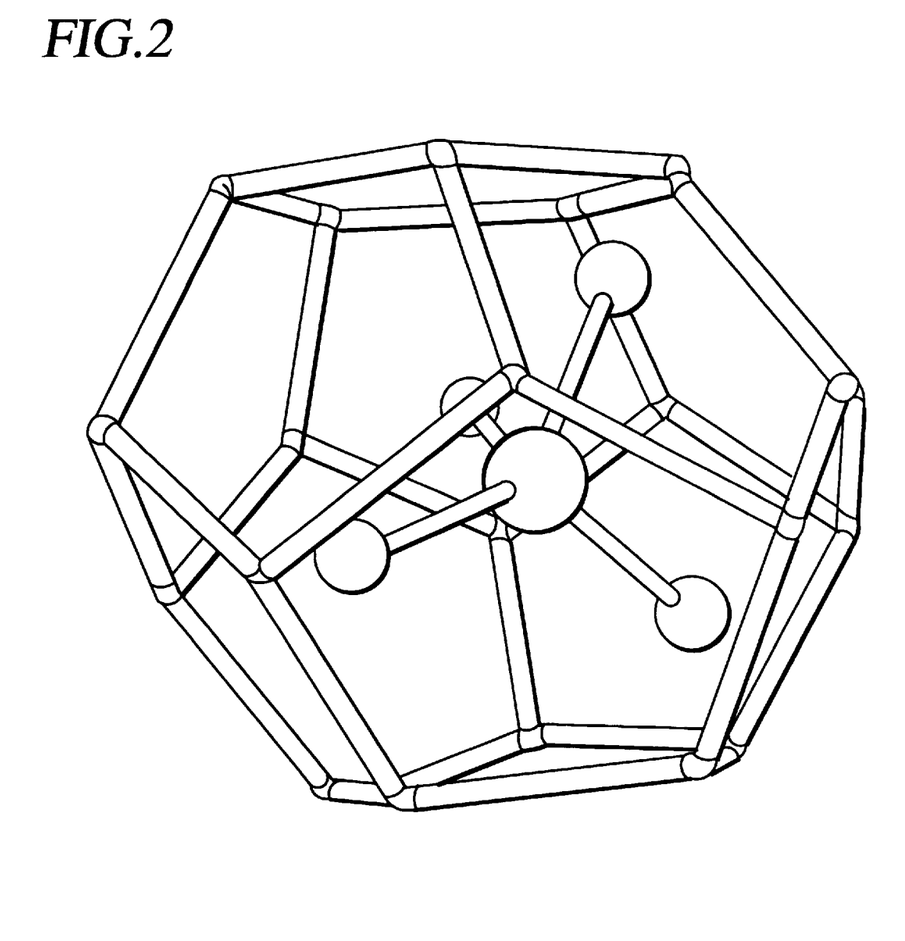
FIG. 2 is a stick model diagram of the simplest water methane clathrate.
Figure 3A:
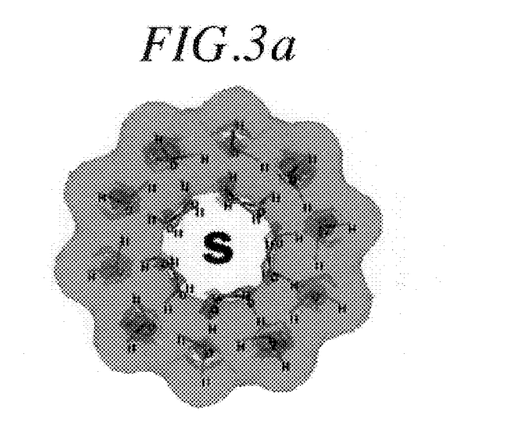
FIG. 3 is a diagram of the delocalized molecular orbitals which stabilize the water methane cluster.
Figure 3B:
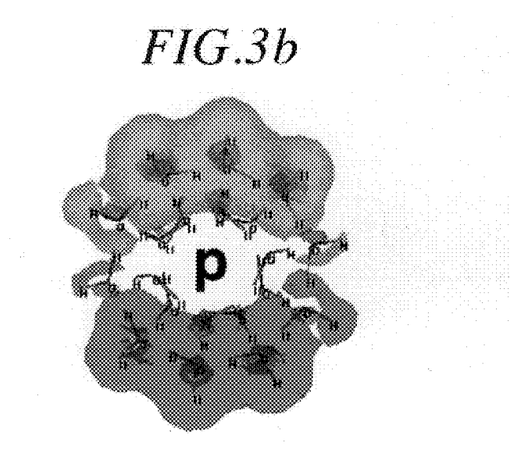
Figure 3C:
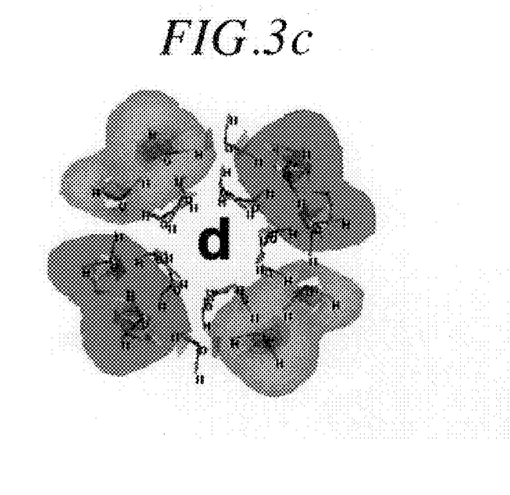
Figure 3D:
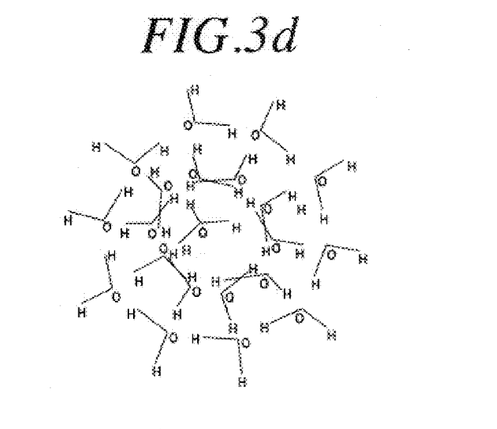
Figure 3E:
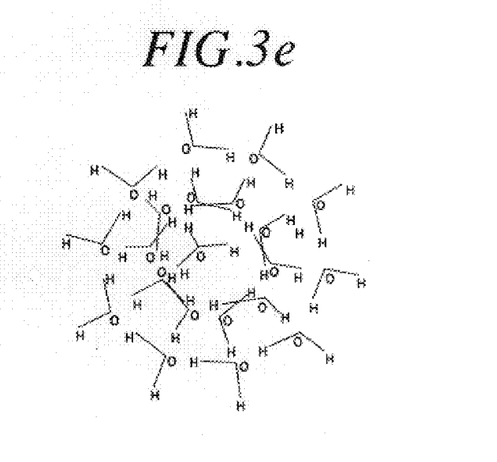
Figure 3F:
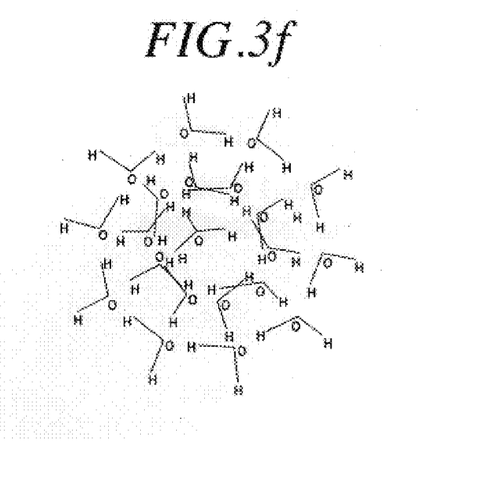
Figure 4:
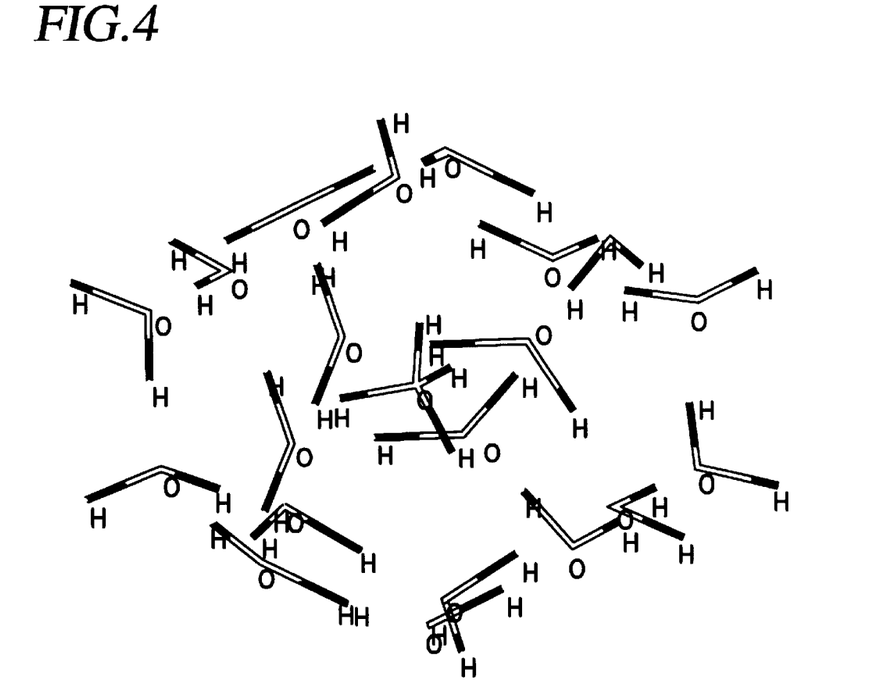
FIG. 4 is a chemical diagram of a vibrational mode of the water methane cluster.

While ordinary bulk liquid water is not usually thought of as an "active" substance, water clusters and water-methane clathrate clusters, especially small symmetrical clusters like the pentagonal dodecahedral cluster shown in FIG. 2 are another matter, however, due to the effectively large reactive cross sections of the cluster surface delocalized molecular orbitals like those mapped in FIGS. 3A–3C. Water-methane clathrate clusters like that shown in FIG. 2 can function as electron reservoirs for chemical reactions involving electron transfer to or from the reacting species. In the oxidation of carbon compounds, such as occurs in hydrocarbon fuel combustion, water-methane cluster delocalized orbitals, originating on the cluster surface oxygen atoms, can readily overlap with the reactive fuel carbon orbitals, such as the $p\pi$ orbital, promoting oxidation. The energy proximity of the cluster s orbital to the nearly degenerate cluster $p_x, p_y, p_z$ orbitals, as shown in FIGS. 3A–B, suggests the strong possibility of coupling between the hydrated electron and low-frequency cluster $H_g$ vibrational modes shown in FIGS. 3D–F and FIG. 4 via the dynamic Jahn-Teller effect. Jahn-Teller (JT) coupling in the clusters leads to a prescribed symmetry breaking of the pentagonal dodecahedron along the low-frequency $H_g$ vibrational squashing mode coordinates $Q_s$, lowering the cluster potential energy from A to the equivalent minima A' shown in the energy plot of FIG. 5.

Figure 5:
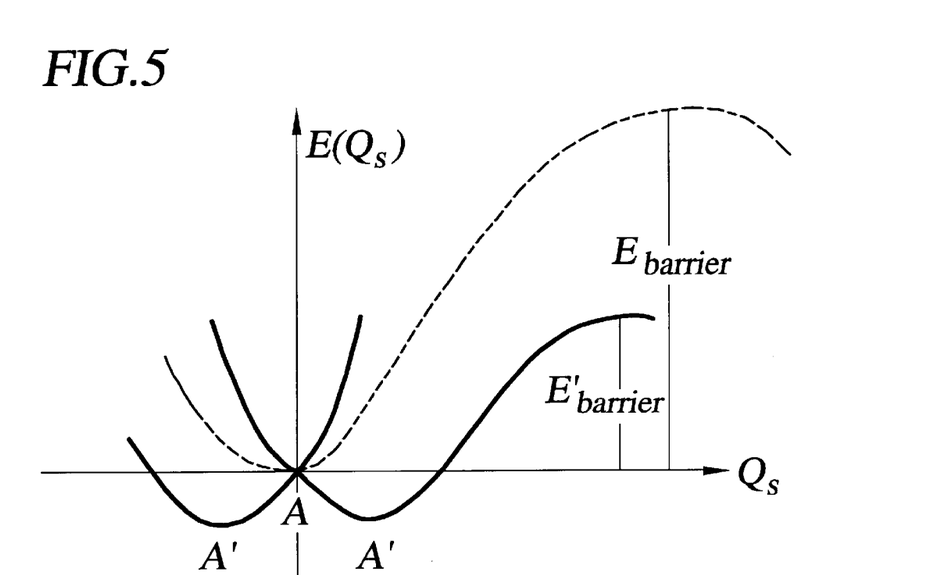
FIG. 5 is a plot of the energy of a water-methane cluster as a function of the Jahn-Teller coupling.

Because of the large JT-induced vibronic displacements and their commensurate large $Q_s$ of cluster surface oxygen atoms in the $H_g$ modes, the energy barrier for expulsion of water oxygen or OH radicals and their oxidative addition to reactive carbon atoms is lowered from $E_{barrier}$ to $E'_{barrier}$, as shown in the plot FIG. 5. The practical use of water clusters to break down and more completely burn particulate matter such as smoke and/or soot precursor molecules, as well as serving as a combustion oxygenate in fossil fuels, has been taught and demonstrated in U.S. Pat. No. 5,800,576, entitled, "Water Clusters and Uses Thereof," issued on Sep. 1, 1998, to inventors Keith H. Johnson, Bin Zhang, and Harry C. Clark; and U.S. Pat. No. 5,997,590, entitled, "Stabilized Water Nanocluster-Fuel Emulsions Designed Through Quantum Chemistry," issued on Dec. 7, 1999, to inventors Keith H. Johnson and Bin Zhang.

EXAMPLE 1

Water and hydrocarbon fuel (No. 2 diesel), each at ambient temperature and pressure, were supplied from 5 and 10 liter Nalgene carboys, respectively. The water and hydrocarbon fuel streams were each pumped separately by one channel of a three-channel Eldex model BBB-4VS proportioning pump at 25 and 50 cc/min, respectively. The flows of the streams were merged and mixed into a single pipe. The mixture consisted of 35.7% water and the remainder the No. 2 diesel. The mixture was heated to about 400° C. by electrical bayonet heaters in a heat exchanger. An adjustable needle valve downstream of the heaters was employed to control the outflow of the system. The valve was set to hold the pressure of the heating system, which was approximately isobaric from the outlet of the pump to the valve, at a pressure of about 2800 psi. The boiling point of water at 2800 psi is about 362° C. and thus all of the water in the mixture was in the gaseous state.

The mixture was fed through an injector in the form of a 16 mil orifice into a combustion area which consisted of a 3"-diameter, 24"-high quartz tube, together with a stream of air fed at about 25 SCFM air. A flame was ignited with a propane torch. After removal of the torch, the mixture was found to continue to combust with a flame that was clear under room light and blue in the dark. Combustion product samples were continuously drawn to an Enerec Model 3000 Emissions analyzer at a rate of about 650 cc/min. The samples were found to include 5 ppm oxides of nitrogen ($NO_X$) and nil ppm carbon monoxide (CO), with the limits of detection being about 0.1 ppm. A 3 liter sample was drawn to an AVL Smoke Meter Model 415 and found to indicate a Filter Smoke Number (FSN) of zero smoke with limits of detection being about 0.01 FSM, in accordance with ISO Draft 10054.

The needle valve was then opened progressively to reduce the pressure of the water-hydrocarbon mixture. The heating system was adjusted when necessary to maintain a mixture temperature of about 400° C.

The following data resulted:

| Mixture Pressure (psi) | Water Boiling Point (° C.) at pressure deployed | Observed Combustion Flame Color | $NO_X$ (ppm) |
|---|---|---|---|
| 2800 | 362 | Blue | 5 |
| 2200 | 343 | Blue | 2 |
| 1800 | 327 | Blue | 3 |
| 1300 | 302 | Blue | 2 |

When, in the same manner, the pressure was significantly increased to about 3350 psi, a blue flame was observed and the $NO_X$ emissions level was found to be about 8 ppm. It is therefore understood that incurring the added burden and costs of operating at this higher pressure, which is above the critical pressure of the mixture and not in accordance with the practice of this invention, does not provide better performance than the sub-critical mixtures of the invention.

EXAMPLE 2

A water-hydrocarbon fuel (No. 2 diesel) mixture was prepared in the manner of Example 1, with 35.7% water and the remainder No. 2 diesel. For this experiment, the heat input was decreased and the needle valve position changed, when needed, to reduce the temperature and maintain the pressure of the mixture at about 1300 psi.

The following data resulted:

| Mixture Temp (° C.) | Water Boiling Point (° C.) at pressure deployed | Observed Combustion Flame Color | $NO_X$ (ppm) |
|---|---|---|---|
| 400 | 302 | Blue | 5 |
| 375 | 302 | Blue | 7 |
| 350 | 302 | Blue | 4 |
| 325 | 302 | Blue | 8 |
| 300 | 302 | Yellow | >100 |

When the temperature was dropped to 300° C., the temperature was very close to, but no longer above the boiling point of water, which is 302° C. at the deployed pressure of 1300 psi. Streaks of yellow in the flame were observed and the flame was found to become unstable and difficult to maintain. The $NO_X$ measurements were found to increase to over 100 ppm, but it was impossible to get a stabilized measurement due to the inability to run a continuous flame.

EXAMPLE 3

A water-hydrocarbon fuel (No. 2 diesel) mixture was prepared in the manner of Example 1, with 35.7% water and the remainder No. 2 diesel. For this experiment, the conditions were set to maintain a mixture temperature of about 400° C. and a mixture pressure of about 2200 psi. The temperature was then decreased as in Example 2. At temperatures above about 350° C. the flame remained blue and the $NO_X$ reading remained in the single numbers of ppm. When the temperature was reduced to 340° C., the mixture temperature was no longer above the boiling point of water (343° C.) at the pressure deployed (2200 psi). At a mixture temperature of about 340° C., the instability was found to recur, noted by a large increase in $NO_X$ and yellow flashes in the flame.

EXAMPLE 4

A water-hydrocarbon fuel (No. 2 diesel) mixture was prepared in the manner of Example 1, with 35.7% water and the remainder No. 2 diesel. For this experiment, the pressure and temperature of the mixture were lowered to about 275° C. and about 150 psi. At about 150 psi, the boiling point of water is about 180° C. A blue flame and a measurement of about 6 ppm $NO_X$ was found at this condition. However, when the temperature was reduced to about 250° C., the $NO_X$ measurement increased to a range of between about 32 and about 37 ppm.

The data produced by these experimental examples indicate that a mixture of water and hydrocarbon fuel at a mixture pressure below the critical pressure of the mixture and at a mixture temperature that is at least the greater of the boiling point temperature of water at the mixture pressure or about 250° C., provides significant emissions advantages.

EXAMPLE 5

Water at ambient temperature and pressure was supplied from a 5 liter Nalgene carboy. The water was pumped by one channel of a three-channel Eldex model BBB-4VS proportioning pump at 25 cc/min. The water was heated to about 285° C. at about 10 psig pressure by electrical bayonet heaters in a heat exchanger. The water was in the vapor state exiting the exchanger. Methane was supplied from a gas cylinder with a regulator set at 10 psig. A flow meter indicated that the flow was 56 SL/min (40 gm/min). The two gaseous streams were joined and the resulting temperature of the mixture was found to be about 110° C.

The mixture was fed through an injector in the form of a 16 mil orifice into a combustion area which consisted of a 7.6 cm-diameter, 61 cm-high quartz tube, together with a stream of air fed at about 25 SCFM air. A flame was ignited with a propane torch. After removal of the torch, the mixture was found to continue to combust with a flame that was clear under room light and blue in the dark. Combustion product samples were continuously drawn to an Enerec Model 3000 Emissions analyzer at a rate of about 650 cc/min. The samples were found to include 2 ppm oxides of nitrogen ($NO_X$) and nil ppm carbon monoxide (CO), with the limits of detection being about 0.1 ppm. A 3 liter sample was drawn to an AVL Smoke Meter Model 415 and found to indicate a Filter Smoke Number (FSN) of zero smoke with limits of detection being about 0.01 FSM, in accordance with ISO Draft 10054.

The water flow was stopped and the heater system allowed to purge itself into the flame. After no more water flowed, the flame appearance was the same, but the oxides of nitrogen ($NO_X$) analysis increased to 11 ppm. CO and smoke were still negligible.

EXAMPLE 6

While operating as in Example 5, the energy to the water heater was reduced until the water vapor exited the heater at 207.2° C. The expected temperature of the mixed water and methane was 82.2° C., but a temperature of 85.5° C. was observed. This indicates that some water was condensing. As the temperature in the mixed line dropped below about 86.6° C. streaks of yellow started appearing. When the temperature in the mixed line stabilized at 85.5° C., the reading of the $NO_X$ meter became variable between 3 and 10 ppm. This shows that the temperature must have been no more than about 10° C. below the boiling point temperature at the pressure employed; which in this case was 10 psig, corresponding to a boiling point temperature for water of 115.5° C.

EXAMPLE 7

In a controlled experiment demonstrating standard operation, a Capstone Model 330 Natural Gas/Low Pressure micro turbine was fed 5.13 std. cubic ft./min natural gas at 5 psig, that is, 107 gm./min natural gas, and combusted. The unit produced 25.0 kW power and emitted 2.78 ppm $NO_X$, dry basis, as measured by a Horiba PG-235 meter.

121 gm./min of 30 psig steam heated to 315.5° C. was blended with the natural gas downstream of the same Capstone radial flow natural gas compressor in the same configuration employed in the foregoing standard operation demonstration. The gaseous mixture was approximately 53% water and 47% natural gas. The mixture temperature was estimated to be 204.4° C. The boiling point of water at 30 psig is 121° C. The gaseous mixture was combusted in the turbine. The turbine produced 25.2 KW and emitted 1.03 ppm $NO_X$, dry basis, a 63% reduction compared to the conventional operation baseline test.

It is recognized, of course, that those skilled in the art may make various modifications and additions to the water-hydrocarbon mixture of the invention as described above without departing from the spirit and scope of the present contribution to the art. Accordingly, it is to be understood that the protection sought to be afforded hereby should be deemed to extend to the subject matter of the claims and all equivalents thereof fairly within the scope of the invention.

We claim:

1. A composition of matter mixture comprising low-molecular weight hydrocarbon and between about 5% and about 70% water and characterized by a critical pressure, the mixture being in a gaseous state, being at a pressure that is below the critical pressure of the mixture, and being at a temperature that is above about 28° C. less than the boiling point temperature of water at the mixture pressure and below about 450° C.

2. The composition of claim 1 wherein the low-molecular weight hydrocarbon is selected from the group consisting of methane, natural gas, and ethane.

3. The composition of claim 1 wherein the mixture is at a temperature that is above about 14° C. less than the boiling point temperature of water at the mixture pressure.

4. The composition of claim 1 wherein the mixture comprises between about 5% and about 70% water with the remainder consisting essentially of low-molecular weight hydrocarbon.

5. The composition of claim 1 wherein the mixture comprises between about 25% and about 60% water.

6. The composition of claim 1 wherein the low-molecular weight hydrocarbon is a hydrocarbon fuel.

7. The composition of claim 6 wherein the hydrocarbon fuel is methane and the mixture temperature is below about 363° C.

8. The composition of claim 1 wherein the mixture consists essentially of hydrocarbon fuel and water.

9. A fuel system comprising:

a source of water;

a source of low-molecular weight hydrocarbon fuel;

at least one pump having an inlet connected to receive at least one of water and hydrocarbon from the source of water and source of hydrocarbon and having at least one outlet for delivering at least one of a water stream and a hydrocarbon fuel stream to a volume to pressurize and transport the water and hydrocarbon fuel;

at least one heater connected to heat the water and hydrocarbon fuel;

a mixer connected to receive the water and hydrocarbon fuel to mix together the water and hydrocarbon fuel; and a water-hydrocarbon fuel mixture in the volume, the mixture comprising hydrocarbon fuel and between about 5% and about 70% water and characterized by a critical pressure, the mixture being at a pressure that is below the critical pressure of the mixture and being at a temperature that is above about 10° C. less than the boiling point temperature of water at the mixture pressure and a temperature that is below about 450° C.

10. The fuel system of claim 9 further comprising an injector connected to an outlet of the volume and a combustion chamber, for delivery of the water-hydrocarbon fuel mixture from the volume to the combustion chamber.

11. The fuel system of claim 9 wherein the volume is of sufficient structural integrity to contain a gaseous composition at a pressure above about 150 psi.

12. The fuel system of claim 9 wherein the at least one pump is of sufficient structural integrity to deliver at least one of a water stream and a hydrocarbon fuel stream at a pressure above about 2,000 psi.

13. The fuel system of claim 10 wherein the combustion chamber is a component of an engine.

14. The fuel system of claim 13 wherein the combustion chamber is a component of a spark ignition engine.

15. The fuel system of claim 13 wherein the combustion chamber is a component of a gas turbine engine.

16. The fuel system of claim 10 wherein the combustion chamber is a component of a steam boiler.

17. The fuel system of claim 10 wherein the injector is of sufficient structural integrity for delivery of the mixture to the combustion chamber under turbulent flow conditions.

18. A method for forming and combusting a hydrocarbon-based fuel comprising the steps of:

forming a mixture comprising low-molecular weight hydrocarbon fuel and between about 5% and about 70% water;

pressurizing the mixture to a pressure that is below a critical pressure of the mixture;

heating the hydrocarbon fuel and the water of the mixture to a temperature that is above about 10° C. less than the boiling point temperature of water at the mixture pressure and below about 450° C.;

delivering the mixture into a combustion chamber; and combusting the mixture in the combustion chamber.

19. The method of claim 18 wherein the step of forming the mixture is carried out before the step of heating the mixture, and wherein the step of heating the mixture comprises heating the mixture to a temperature above about 125° C.

20. The method of claim 18 wherein the step of heating the hydrocarbon fuel and the water of the mixture is carried out before the step of forming the mixture, and comprises heating the water and hydrocarbon fuel separately.

21. The method of claim 18 wherein the hydrocarbon fuel is methane fuel and wherein the step of heating the mixture comprises heating the mixture to a temperature that is below about 363° C.

\* \* \* \* \*